(12) United States Patent
Wang et al.

(10) Patent No.: US 12,270,542 B2
(45) Date of Patent: Apr. 8, 2025

(54) COMBUSTOR LINER WITH SHIELD HOLES

(71) Applicant: GENERAL ELECTRIC COMPANY, Schenectady, NY (US)

(72) Inventors: Anquan Wang, Mason, OH (US); Eric John Ruggiero, West Chester, OH (US)

( * ) Notice: Subject to any disclaimer, the term of this patent is extended or adjusted under 35 U.S.C. 154(b) by 447 days.

(21) Appl. No.: 17/187,040

(22) Filed: Feb. 26, 2021

(65) Prior Publication Data

US 2021/0199296 A1     Jul. 1, 2021

Related U.S. Application Data

(63) Continuation of application No. 15/460,924, filed on Mar. 16, 2017, now abandoned.

(51) Int. Cl.
*F23R 3/06* (2006.01)
*F23R 3/00* (2006.01)

(52) U.S. Cl.
CPC .............. *F23R 3/002* (2013.01); *F23R 3/06* (2013.01); *F23R 2900/03041* (2013.01); *F23R 2900/03042* (2013.01); *Y02T 50/60* (2013.01)

(58) Field of Classification Search
CPC .... F23R 3/002; F23R 3/14; F23R 3/60; F23R 2900/03041; F23R 2900/03042
See application file for complete search history.

(56) References Cited

U.S. PATENT DOCUMENTS

| | | | |
|---|---|---|---|
| 3,623,711 A | 11/1971 | Thorstenson | |
| 3,656,297 A | 4/1972 | Monk | |
| 4,267,698 A | 5/1981 | Hartmann et al. | |
| 4,302,941 A | 12/1981 | DuBell | |
| 4,653,279 A | 3/1987 | Reynolds | |
| 4,875,339 A | 10/1989 | Rasmussen et al. | |
| 5,241,827 A | 9/1993 | Lampes | |
| 5,465,572 A | 11/1995 | Nicoll et al. | |
| 6,170,266 B1 | 1/2001 | Pidcock et al. | |
| 6,205,789 B1 | 3/2001 | Patterson et al. | |
| 6,383,602 B1 | 5/2002 | Fric et al. | |
| 6,408,629 B1 | 6/2002 | Harris et al. | |
| 6,499,993 B2 | 12/2002 | Steber et al. | |
| 6,546,731 B2 * | 4/2003 | Alkabie ................ | F23R 3/04 60/757 |
| 6,655,146 B2 | 12/2003 | Kutter et al. | |
| 6,655,149 B2 | 12/2003 | Farmer et al. | |
| 7,036,316 B2 | 5/2006 | Howell et al. | |
| 7,086,232 B2 | 8/2006 | Moertle et al. | |
| 7,509,809 B2 | 3/2009 | Patel et al. | |
| 7,669,422 B2 | 3/2010 | Suleiman et al. | |
| 7,748,222 B2 | 7/2010 | Bernier et al. | |
| 7,905,094 B2 | 3/2011 | Dudebout et al. | |
| 8,091,367 B2 | 1/2012 | Alkabie | |
| 8,572,983 B2 | 11/2013 | Xu | |
| 9,010,121 B2 | 4/2015 | Taylor et al. | |

(Continued)

*Primary Examiner* — Steven M Sutherland

(57) ABSTRACT

An apparatus, system, and method of reducing film cooling scrubbing in a combustor are provided. The apparatus includes a combustor liner that includes a field of a plurality of sparsely-spaced film holes that extend through the combustor liner wherein the field includes a boundary. The combustor liner also includes a patch of relatively more densely-spaced shield holes that extend through the combustor liner at specific predetermined locations within the boundary of the field.

14 Claims, 9 Drawing Sheets

(56) References Cited

U.S. PATENT DOCUMENTS

| | | |
|---|---|---|
| 9,052,111 B2 | 6/2015 | Erbas-Sen et al. |
| 9,181,819 B2 | 11/2015 | Lee et al. |
| 9,217,568 B2 | 12/2015 | Cunha et al. |
| 9,696,036 B2 | 7/2017 | Clemen |
| 2006/0196188 A1 | 9/2006 | Burd et al. |
| 2007/0028595 A1 | 2/2007 | Mongia et al. |
| 2008/0271457 A1 | 11/2008 | McMasters et al. |
| 2009/0013530 A1 | 1/2009 | Rudrapatna et al. |
| 2009/0067998 A1* | 3/2009 | Beck .................... F01D 5/286 |
| | | 165/104.19 |
| 2013/0269354 A1 | 10/2013 | Starkweather et al. |
| 2015/0101335 A1 | 4/2015 | Jayatunga |
| 2016/0245094 A1* | 8/2016 | Bunker .................. F01D 25/12 |
| 2016/0265777 A1 | 9/2016 | Hoke et al. |
| 2016/0273363 A1 | 9/2016 | Bunker et al. |

* cited by examiner

COMBUSTOR LINER WITH SHIELD HOLES

CROSS REFERENCE TO RELATED APPLICATION

This application is a continuation of U.S. patent application Ser. No. 15/460,924 filed Mar. 16, 2017, which is incorporated herein in its entirety.

BACKGROUND

The field of the disclosure relates generally to gas turbine engines and, more particularly, to a method and system for reducing scrubbing of a combustor liner cooling film in gas turbine engines.

At least some known gas turbine engines use a combustion chamber system that includes a radially inner liner and a radially outer liner to maintain combustion within a certain predetermined zone. Because the inner and outer liners are subject to exposure to the harsh environment next to the combustion zone, a flow of cooling air is often provided to the liners to facilitate increasing their life. The cooling air is introduced to the liners on a side opposite the combustion zone and channeled through a plurality of sparsely-spaced film holes formed through the liners. The holes are positioned to attempt to form a film of cooling air along the surface of the liners next to the combustion zone.

In gas turbine engines that use lean burn technology using high flow swirlers in the fuel burner of the combustor, the main flow from the burner includes an axial component and a strong circumferential or swirl component. In some cases or modes of operation the main flow may interact with the film cooling flow to disrupt, maldistribute, or scrub the film cooling flow.

BRIEF DESCRIPTION

In one aspect the disclosure relates to a combustor for a turbine engine comprising a combustor liner having an inner surface defining a combustion zone; an annular dome mounted upstream of the combustion zone; a plurality of mixer assemblies spaced circumferentially around the annular dome to form a fuel-air mixture, the fuel-air mixture comprising an axial component and a circumferential component, that is provided to the combustion zone; a field defining an area of the combustor liner having a plurality of sparsely-spaced film holes defining a first distance between adjacent sparsely-spaced film holes; and a patch defining an area located within the field at a location where the circumferential component interacts with the combustor liner during operation, the patch having a plurality of densely-spaced shield holes defining a second distance between adjacent densely-spaced shield holes, the second distance smaller than the first distance.

In another aspect the disclosure relates to a combustor liner comprising an inner surface defining a combustion zone for receiving a fuel-air mixture comprising an axial component and a circumferential component; a field defining an area of the combustor liner having a plurality of sparsely-spaced film holes defining a first distance between adjacent sparsely-spaced film holes; and a patch defining an area located within the field at a location where the circumferential component interacts with the combustor liner during operation, the patch having a plurality of densely-spaced shield holes defining a second distance between adjacent densely-spaced shield holes, the second distance smaller than the first distance.

In yet another aspect the disclosure relates to a method of reducing an interaction of a fuel-air mixture with a cooling film in a combustor having a combustor liner at least partially defining a combustion zone, the method comprising flowing a cooling fluid through a set of film holes in the combustor liner; forming a laminar flow of the cooling fluid along an inner surface of the combustor liner; swirling a fuel-air mixture into the combustion zone to form an axial flow component and a circumferential flow component; flowing the cooling fluid through a set of shield holes extending through the combustor liner in an area on the inner surface of the combustor liner where the circumferential flow component interacts with the laminar flow; and forming a shield flow for shielding the laminar flow from the circumferential flow component.

BRIEF DESCRIPTION OF THE DRAWINGS

FIG. 1 is a perspective view of an aircraft.

FIG. 2 is a schematic cross-sectional view of a gas turbine engine in accordance with an exemplary embodiment of the present disclosure.

FIG. 3 is an exemplary embodiment of a combustor including a combustion zone defined between and by an annular radially outer liner and an annular radially inner liner, respectively circumscribed about an engine centerline.

FIG. 4 is a portion of the outer liner or the inner liner shown in FIG. 3 in accordance with an example embodiment of the present disclosure.

FIG. 5 is a known liner portion that does not include densely-spaced shield holes.

FIG. 6 is a visualization of a flow distribution of the liner portion shown in FIG. 5.

FIG. 7 is a visualization of a flow distribution of the liner portion shown in FIG. 4.

FIG. 8 is an end view of the combustor shown in FIG. 2 looking axially aft or downstream.

FIG. 9 is a side view of the liner portion, shown in FIG. 4, illustrating an embodiment of sparsely-spaced film holes.

FIG. 10 is a side view of the liner portion, shown in FIG. 4, illustrating another embodiment of sparsely-spaced film holes.

FIG. 11 is a flowchart of a method of reducing film cooling scrubbing in a combustor.

Figure 1:
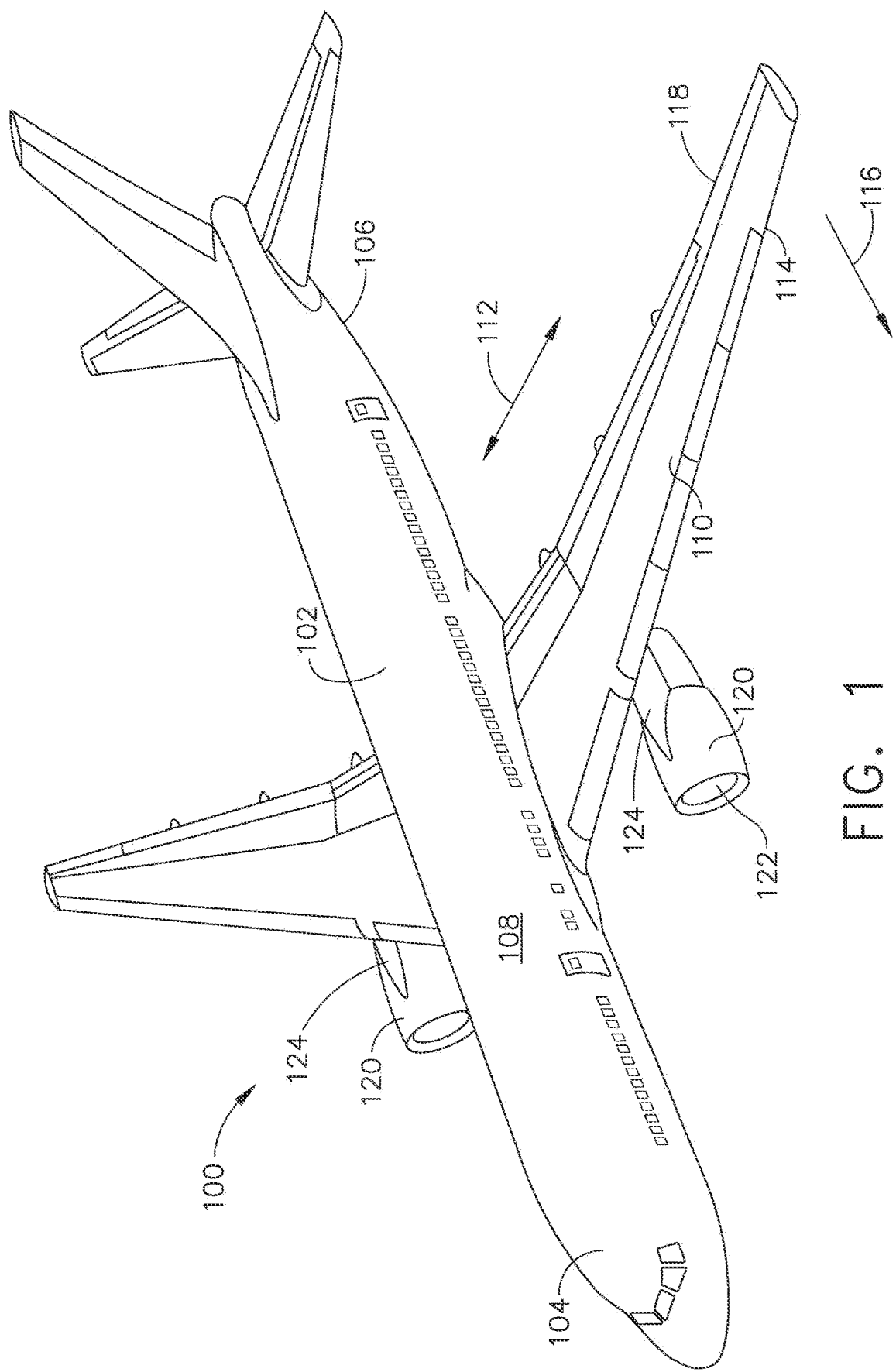
FIGS. 1-11 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to managing cooling flow interactions in combustion zones of burner equipment in industrial and commercial applications.

Embodiments of a system for managing film cooling are described herein. Many types of equipment use lined combustors for generating heat or a flow of high energy combustion gases. Combustion liners are used to contain the combustion process in a specific predetermined area. Combustor liners need protection from the harsh environment in which they operate to extend their life. In some cases this protection is in the form of a cooling film of fluid directed to flow along the surface of the liner. The cooling film is generated and maintained by a field of a plurality of sparsely-spaced film holes that extend through the liner at specific predetermined locations in a multihole pattern. As used herein, sparsely-spaced film holes are spaced approximately three to twenty hole diameters (D) away from each other. The spacing is measured between pierce points between adjacent holes/rows. In-row (lateral or circumferential) spacing and between-row (axial) spacing can be different. The locations are selected after analysis and/or empirical evaluation. The cooling film reduces the heat received by the liner from the combustion process by absorbing the heat before it reaches the liner and receives heat from the liner itself to facilitate reducing its temperature. The received heat is then carried out of the combustor area by the flow of cooling fluid and directed offboard the associated equipment.

To prevent the cooling film from being disrupted by other flows that pass the combustion liner surface, a patch of round, densely-spaced shield holes are introduced to the field of sparsely-spaced film holes. As used herein, densely-spaced holes are spaced approximately one and a half to ten hole diameters (D) away from each other, such that, in any particular application, a distance between adjacent sparsely-spaced film holes is greater than a distance between adjacent densely-spaced shield holes. Accordingly, shield holes in the patch of relatively more densely-spaced shield holes are spaced apart from each other relatively more densely than the film holes in the field of sparsely-spaced film holes are. The flows that can disrupt cooling film include the main burner flow that may include a strong radial and/or circumferential component. In one embodiment, the densely-spaced shield holes generate a flow of shield fluid that exits the surface of the liner substantially orthogonal to the liner surface at a velocity that causes the flow of shield fluid to interact with the main burner flow to shield the cooling film. In other embodiments, the densely-spaced shield holes generate a flow of shield fluid that exits the surface of the liner at a relatively shallow angle to the liner surface at a velocity that causes the flow of shield fluid from the round holes to interact with the main burner flow to shield and/or strengthen the cooling film. The shielded cooling film is prevented from being scrubbed from the surface of the combustor liner and is therefore able to provide protection to the combustor liner.

The following description refers to the accompanying drawings, in which, in the absence of a contrary representation, the same numbers in different drawings represent similar elements.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one gas turbine engine 120 configured to drive a bladed rotatable member 122 or fan to generate thrust. At least one gas turbine engine 120 is connected to an engine pylon 124, which may connect at least one gas turbine engine 120 to aircraft 100. Engine pylon 124, for example, may couple at least one gas turbine engine 120 to at least one of wing 110 and fuselage 102, for example, in a pusher configuration (not shown) proximate tail 106.

Figure 2:
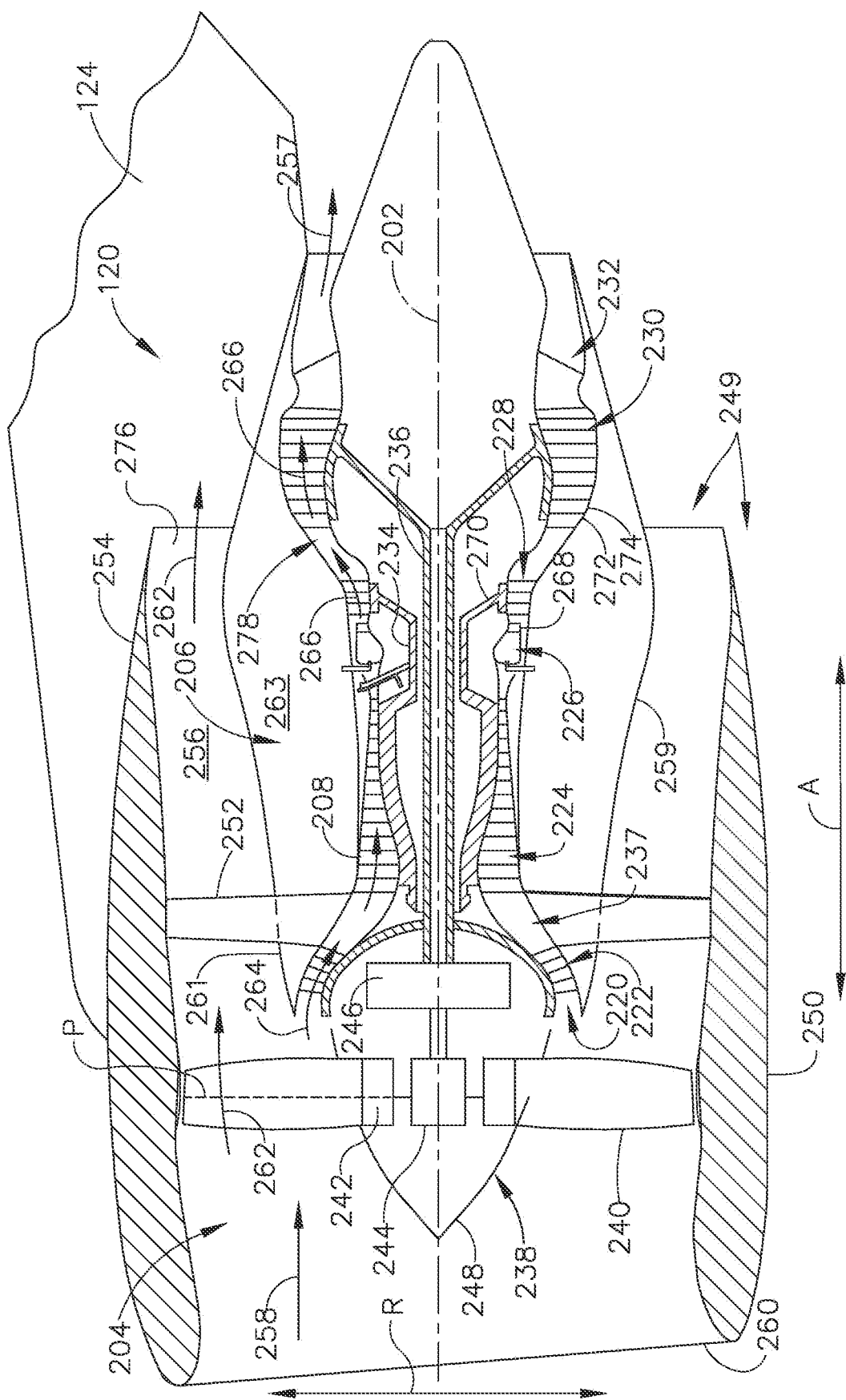

FIG. 2 is a schematic cross-sectional view of gas turbine engine 120 in accordance with an exemplary embodiment of the present disclosure. In the example embodiment, gas turbine engine 120 is embodied in a high-bypass turbofan jet engine. As shown in FIG. 2, gas turbine engine 120 defines an axial direction A (extending parallel to a longitudinal axis 202 provided for reference) and a radial direction R. In general, gas turbine engine 120 includes a fan assembly 204 and a core turbine engine 206 disposed downstream from fan assembly 204.

In the example embodiment, core turbine engine 206 includes an approximately tubular engine casing 208 that defines an annular core engine inlet 220. Engine casing 208 encases, in serial flow relationship, a compressor section including a booster or low pressure (LP) compressor 222 and a high pressure (HP) compressor 224; a combustion section including a combustor 226; a turbine section including a high pressure (HP) turbine 228 and a low pressure (LP) turbine 230; and a jet exhaust nozzle 232. A high pressure (HP) shaft or spool 234 drivingly connects HP turbine 228 to HP compressor 224. A low pressure (LP) shaft or spool 236 drivingly connects LP turbine 230 to LP compressor 222. The compressor section, combustion section, turbine section, and jet exhaust nozzle 232 together define a core flowpath 237.

In the example embodiment, fan assembly 204 includes bladed rotatable member 122 (shown in FIG. 1) embodied as a variable pitch fan 238 having a plurality of fan blades 240 coupled to a disk 242 in a spaced apart relationship. Fan blades 240 extend radially outwardly from disk 242. Each fan blade 240 is rotatable relative to disk 242 about a pitch axis P by virtue of fan blades 240 being operatively coupled to a suitable pitch change mechanism (PCM) 244 configured to vary the pitch of fan blades 240. In other embodiments, pitch change mechanism (PCM) 244 is configured to collectively vary the pitch of fan blades 240 in unison. Fan blades 240, disk 242, and pitch change mechanism 244 are together rotatable about longitudinal axis 202 by LP shaft 236 across a power gear box 246. Power gear box 246 includes a plurality of gears for adjusting the rotational speed of fan 238 relative to LP shaft 236 to a more efficient rotational fan speed.

Disk 242 is covered by rotatable front hub 248 aerodynamically contoured to promote an airflow through the plurality of fan blades 240. Additionally, fan assembly 204 and at least a portion of core turbine engine 206 are surrounded by a nacelle assembly 249. Nacelle assembly 249 is a system of components or structures attached to gas turbine engine 120 and/or engine pylon 124, and provides aerodynamic surfaces around gas turbine engine 120. Nacelle assembly 249 may include an annular fan casing or outer nacelle 250 and a core engine cowl or inner nacelle 259 generally separated by a bypass duct 256.

Outer nacelle 250 circumferentially surrounds fan 238 and/or at least a portion of core turbine engine 206. More specifically, a downstream section 254 of outer nacelle 250 may extend over a forward portion 261 of inner nacelle 259 so as to define bypass duct 256 therebetween, with outer nacelle 250 providing a radially outer wall for bypass duct 256 and inner nacelle 259 providing a radially inner wall. In the example embodiment, outer nacelle 250 is configured to be supported relative to core turbine engine 206 by a plurality of circumferentially-spaced outlet guide vanes 252.

Nacelle assembly 249 further defines an inlet opening 260 of fan assembly 204 and outer nacelle 250, defines core engine inlet 220 for core flowpath 237, defines appropriate nozzles for the exhaust of bypass duct 256 and a core exhaust 257, and houses or contains auxiliary devices for the engine and other components for the aircraft including various ducts, lines, pipes and wires.

Inner nacelle 259 forms a generally cylindrical or barrel-shaped cowl around the engine casing 208 and helps define an engine core compartment 263. Inner nacelle 259 houses and is configured to provide an aerodynamic cover for engine casing 208.

During operation of gas turbine engine 120, a volume of air 258 enters gas turbine engine 120 through inlet opening 260 of outer nacelle 250 and/or fan assembly 204. As volume of air 258 passes across fan blades 240, a bypass portion 262 of volume of air 258 is directed or routed into bypass duct 256 and a core engine portion 264 of volume of air 258 is directed or routed into core flowpath 237, or more specifically into LP compressor 222. A ratio between bypass portion 262 and core engine portion 264 is commonly referred to as a bypass ratio. The pressure of core engine portion 264 is then increased as it is routed through high pressure (HP) compressor 224 and into combustion section, where it is mixed with fuel and burned in the combustor 226 to provide combustion gases 266.

Combustion gases 266 are routed through HP turbine 228 where a portion of thermal and/or kinetic energy from combustion gases 266 is extracted via sequential stages of HP turbine stator vanes 268 that are coupled to engine casing 208 and HP turbine rotor blades 270 that are coupled to HP shaft or spool 234, thus causing HP shaft or spool 234 to rotate, which then drives a rotation of HP compressor 224. Combustion gases 266 are then routed through LP turbine 230 where a second portion of thermal and kinetic energy is extracted from combustion gases 266 via sequential stages of LP turbine stator vanes 272 that are coupled to engine casing 208 and LP turbine rotor blades 274 that are coupled to LP shaft or spool 236, which drives a rotation of LP shaft or spool 236 and LP compressor 222 and/or rotation of fan 238.

Combustion gases 266 are subsequently routed through jet exhaust nozzle 232 of core turbine engine 206 to provide propulsive thrust. Simultaneously, the pressure of bypass portion 262 is substantially increased as bypass portion 262 is routed through bypass duct 256 before it is exhausted from a fan exhaust nozzle 276 of gas turbine engine 120, also providing propulsive thrust. HP turbine 228, LP turbine 230, and jet exhaust nozzle 232 at least partially define a hot gas path 278 for routing combustion gases 266 through core turbine engine 206.

Gas turbine engine 120 is depicted in the figures by way of example only, in other exemplary embodiments, gas turbine engine 120 may have any other suitable configuration including for example, a turboprop engine, a turboshaft engine, a military purpose engine, and a marine or land-based aero-derivative engine.

Figure 3:
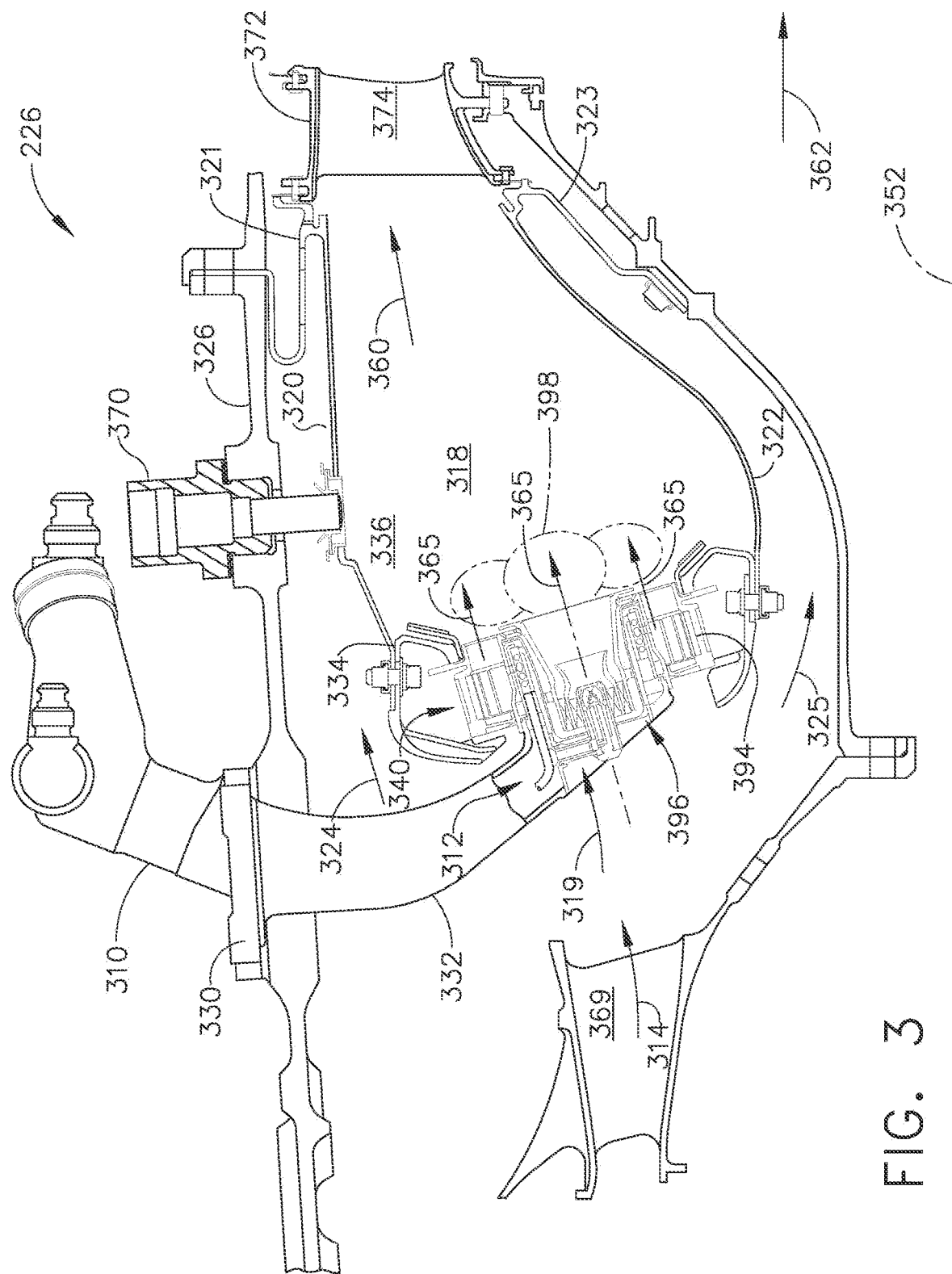

FIG. 3 is an exemplary embodiment of combustor 226 including a combustion zone 318 defined between and by an annular radially outer liner 320 and an annular radially inner liner 322, respectively circumscribed about an engine centerline 352. The outer and inner liners 320, 322 are located radially inwardly of an annular combustor casing 326 which extends circumferentially around outer and inner liners 320, 322. The combustor 226 also includes an annular dome 334 mounted upstream of the combustion zone 318 and attached to the outer and inner liners 320, 322. Outer and inner liners 320, 322 are supported at an upstream end by dome 334 or associated dome support structure (not shown), and a downstream end of outer and inner liners 320, 322 are supported by an aft outer liner support 321 or by an aft inner liner support 323. Dome 334 defines an upstream end 336 of the combustion zone 318 and a plurality of mixer assemblies 340 (only one is illustrated) are spaced circumferentially around dome 334. Each mixer assembly 340 includes a main mixer 394 mounted in the dome 334 and a pilot mixer 396. In one embodiment, pilot mixer 396 is supplied with fuel during the entire engine operating cycle and main mixer 394 is supplied with fuel only during increased power conditions of the engine operating cycle.

Combustor 226 receives an annular stream of pressurized compressor discharge air 314 from a high pressure compressor discharge outlet 369, sometimes referred to as CDP air (compressor discharge pressure air). A first portion 319 of the compressor discharge air 314 flows into the mixer assembly 340, where fuel is also injected to mix with the air and form a fuel-air mixture 365 that is provided to the combustion zone 318 for combustion. Ignition of the fuel-air mixture 365 is accomplished by an ignitor 370, and the resulting combustion gases 360, also referred to as combustion gases 266 in FIG. 2, flow in an axial direction 362 toward and into an annular, first stage turbine nozzle 372. The first stage turbine nozzle 372 is defined by an annular flow channel that includes a plurality of radially extending, circularly-spaced nozzle vanes 374 that turn the gases so that they flow angularly and impinge upon the first stage turbine blades (not shown) of a first turbine (not shown).

The arrows in FIG. 3 illustrate the directions in which compressor discharge air flows within combustor 226. An outer portion 324 of the compressor discharge air 314 flows around the outer liner 320 and an inner portion 325 of the compressor discharge air 314 flows around the inner liner 322. A fuel injector 310 includes a nozzle mount or flange 330 adapted to be fixed and sealed to the combustor casing 326. A hollow stem 332 of the fuel injector 310 is integral with or fixed to the flange 330 (such as by brazing or welding) and includes a fuel nozzle assembly 312. The hollow stem 332 supports the fuel nozzle assembly 312 and the pilot mixer 396. Fuel and air are provided to pilot mixer 396 at all times during the engine operating cycle so that a primary combustion zone 398 is produced within a central portion of combustion zone 318.

Figure 4:
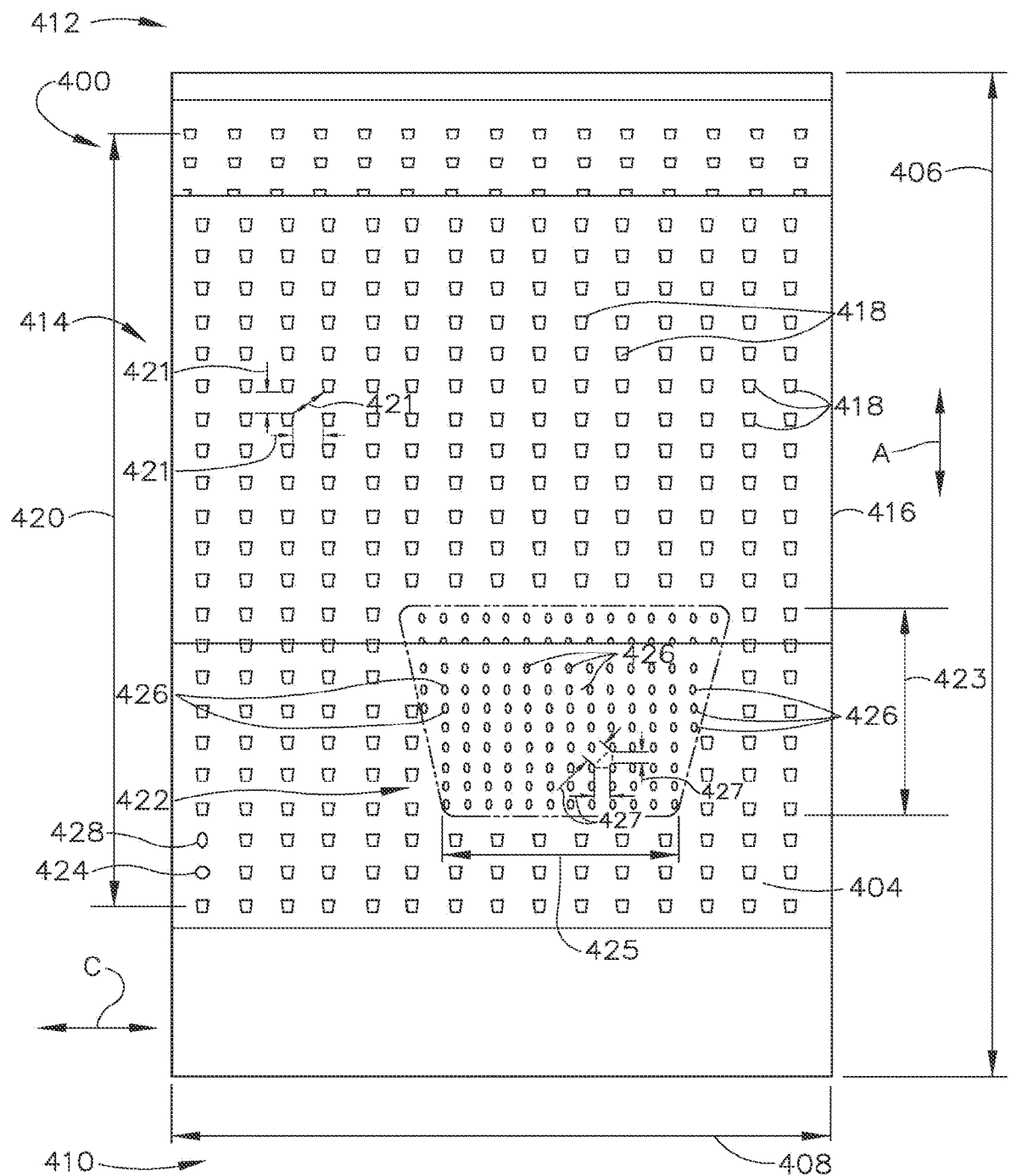

FIG. 4 is a plan view of a liner portion 400 of outer liner 320 or inner liner 322 (shown in FIG. 3) in accordance with an example embodiment of the present disclosure. In the example embodiment, liner portion 400 includes a surface 404 that is exposed to combustion zone 318 during operation. Liner portion 400 also includes a length 406 in axial direction A and a width 408 in a circumferential direction C. With reference to FIGS. 3 and 4, because of the changing cross-section of liner portion 400 from upstream end 336 to first stage turbine nozzle 372, width 408 may be of different values at an upstream end 410 of liner portion 400 and a downstream end 412 of liner portion 400. In the example embodiment, upstream end 410 is couplable to dome 334 or associated support structure (not shown) coupled to dome 334. In other embodiments, liner portion 400 is couplable to an upstream liner portion (not shown in FIG. 4). Also in the example embodiment, downstream end 412 is couplable to a downstream liner portion (not shown in FIG. 4) and in other embodiments, downstream end 412 is couplable to an aft outer liner support 321 or to aft inner liner support 323. Liner portion 400 is joined to other similar liner portions to form outer liner 320 or inner liner 322.

Liner portion 400 includes a field 414 of a plurality of sparsely-spaced film holes 418 that extend through liner portion 400 at specific predetermined locations in a multi-hole pattern along an axial field length 420. In various embodiments, sparsely-spaced film holes 418 are spaced uniformly in a homogenous pattern along liner portion 400, such that a first distance 421 between adjacent sparsely-spaced film holes 418 within a boundary 416 of field 414 are approximately uniform. In other embodiments, first distance 421 may vary between adjacent sparsely-spaced film holes 418. Sparsely-spaced film holes 418 extend through liner portion 400 so that outer portion 324 or inner portion 325 of the compressor discharge air 314 flows through sparsely-spaced film holes 418 to form a cooling film along surface 404. In some embodiments, sparsely-spaced film holes 418 may have a round cross-section 424 having a first cross-sectional area. In other embodiments, sparsely-spaced film holes 418 may have an oval cross-section 428 having a second cross-sectional area, wherein the first and second cross-sectional areas may be the same or different. In various other embodiments, sparsely-spaced film holes 418 may have other cross-sections or multiple different cross-sections and different cross-sectional areas along their length 902 (shown in FIG. 9).

The cooling film is a laminar flow of cooling fluid that is generated by outer portion 324 or inner portion 325 of the compressor discharge air 314 exiting sparsely-spaced film holes 418 and being directed by sparsely-spaced film holes 418 at a predetermined angle with respect to surface 404. In some locations, interactions with the flow of fuel-air mixture 365 cause a disruption in the laminar flow of the cooling film. In some cases the cooling film may be scrubbed away from surface 404, exposing surface 404 to the harsh environment of combustion zone 318. To prevent or limit such interactions, a patch 422 of a plurality of densely-spaced shield holes 426 is positioned in a predetermined location to intercept the flow of fuel-air mixture 365 proximate surface 404 to counter the effects of the interaction of the flow of fuel-air mixture 365 with the laminar flow of the cooling film. Patch 422 is positioned proximate a location determined to be affected by scrubbing of the laminar flow of the cooling film by the flow of fuel-air mixture 365. In various embodiments, patch 422 is a contiguous area of densely-spaced shield holes 426 within boundary 416. Although illustrated as a relatively compact shape, patch 422 may be less compact, for example, having a length 423 in one direction greater than a width 425 in an orthogonal direction, or patch 422 may be non-contiguous and may comprise a plurality of patches. As used herein, sparsely-spaced and densely-spaced are relative with respect to spacing between sparsely-spaced film holes 418 in field 414 and the spacing between densely-spaced shield holes 426 in patch 422. In various embodiments, densely-spaced shield holes 426 are spaced uniformly in a homogenous pattern along liner portion 400, such that a second distance 427 between adjacent densely-spaced shield holes 426 within patch are approximately uniform. The spacing between sparsely-spaced film holes 418 may vary over a range of distance and the spacing of densely-spaced shield holes 426 may vary over a different range of distance. In any particular application, because sparsely-spaced film holes 418 are termed "sparsely-spaced" and densely-spaced shield holes 426 are termed "densely-spaced," a distance between adjacent sparsely-spaced film holes 418 is greater than a distance between adjacent densely-spaced shield holes 426.

As described below in greater detail, in some embodiments, densely-spaced shield holes 426 are shaped differently than sparsely-spaced film holes 418. For example, in one embodiment, sparsely-spaced film holes 418 extend through liner portion 400 at an oblique angle with respect to surface 404, whereas densely-spaced shield holes 426 extend through liner portion 400 approximately orthogonally with respect to surface 404. In other embodiments, densely-spaced shield holes 426 extend through liner portion 400 at an oblique angle with respect to surface 404. The angle may be the same or different from the angle at which sparsely-spaced film holes 418 extend through liner portion 400. Additionally, sparsely-spaced film holes 418 may be non-circular in cross-section and densely-spaced shield holes 426 may be circular or vice versa. In various embodiments, sparsely-spaced film holes 418 have a diffuser end at surface 404, whereas densely-spaced shield holes are cylindrical with no surface treatments.

Figure 5:
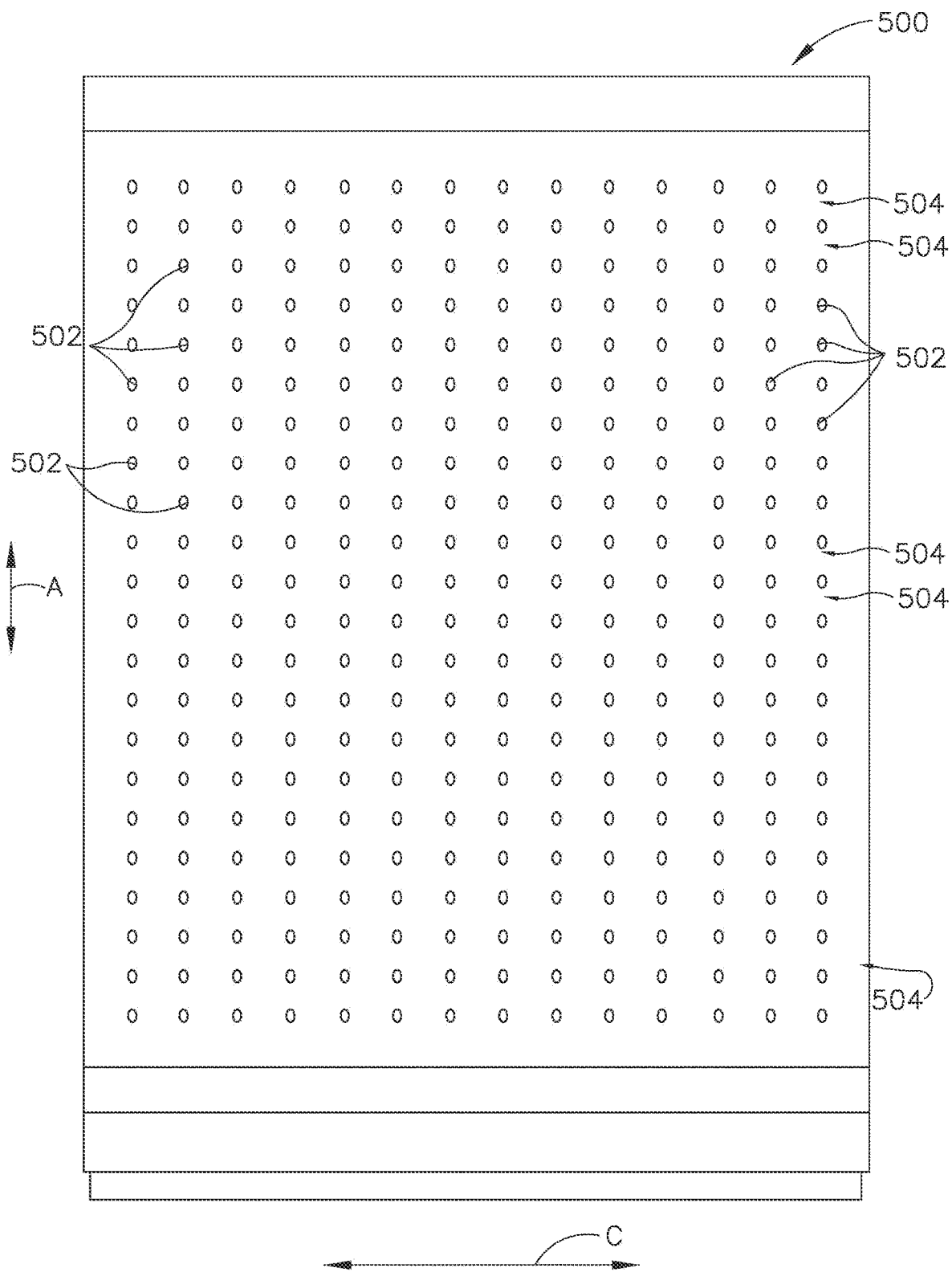

FIG. 5 is a known liner portion 500 that does not include densely-spaced shield holes. Rather, liner portion 500 includes a plurality of sparsely-spaced film holes 502. In the example embodiment, sparsely-spaced film holes 502 are arranged in a plurality of rows 504 spaced axially along liner portion 500. Also, in the example embodiment, sparsely-spaced film holes 502 in each row 504 are circumferentially offset with respect to sparsely-spaced film holes 502 in an axially adjacent row 504. Sparsely-spaced film holes 502 are sparsely-spaced approximately equidistant from each other film hole 502.

Figure 6:
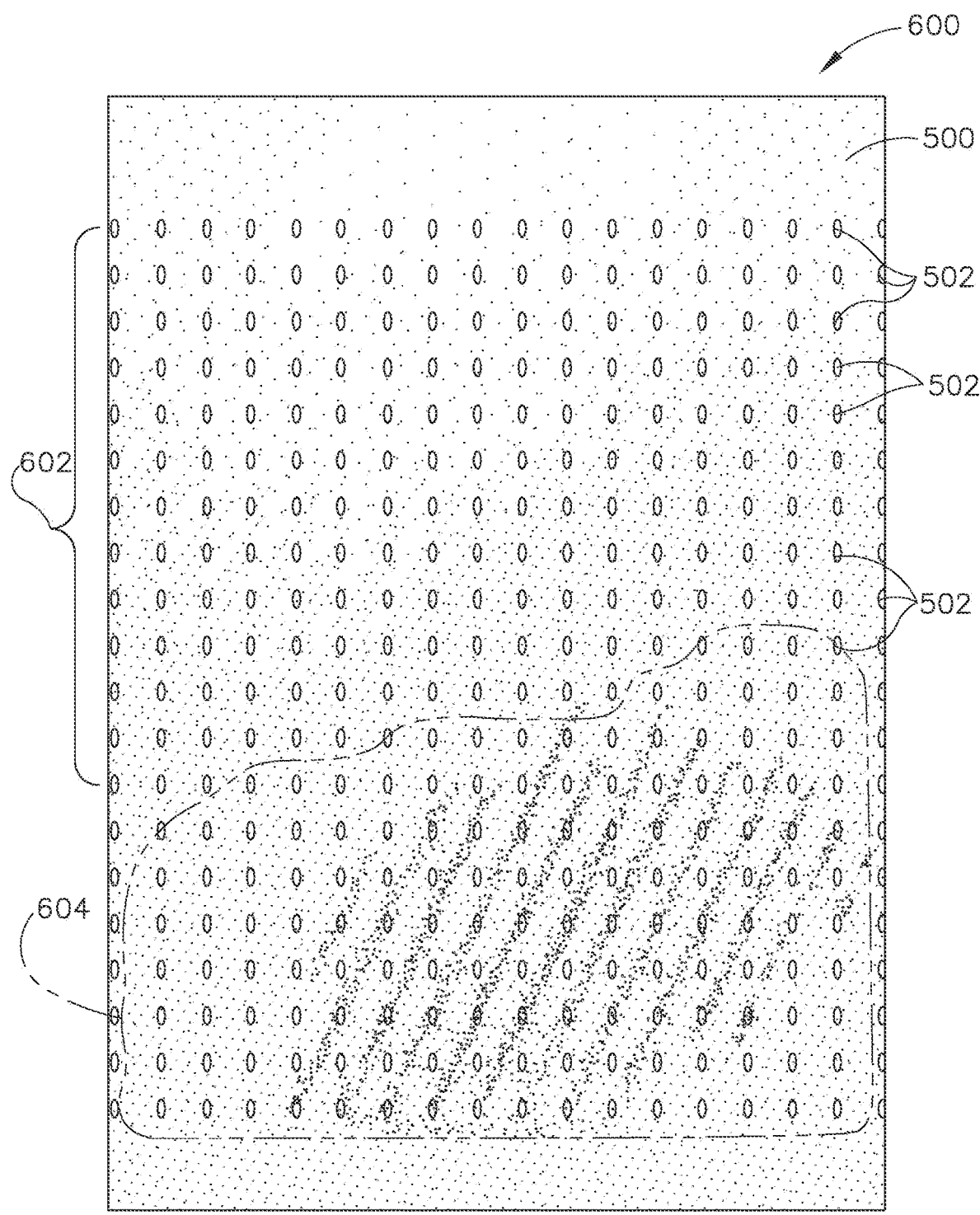

FIG. 6 is a visualization 600 of a flow distribution of liner portion 500 (shown in FIG. 5). Plurality of sparsely-spaced film holes 502 form a field of approximately uniform flow characteristics that forms an approximately uniform, but diminished cooling film along liner portion 500. However, a strong flow of a fuel-air mixture similar to fuel-air mixture 365 (shown in FIG. 3) that includes a significant swirl or circumferential flow component can disrupt flow exiting sparsely-spaced film holes 502 and prevent a cooling film from forming along surface of liner portion 500. A first area 602 of substantially uniform cooling film is contrasted with a second area 604 of disrupted flow.

Figure 7:
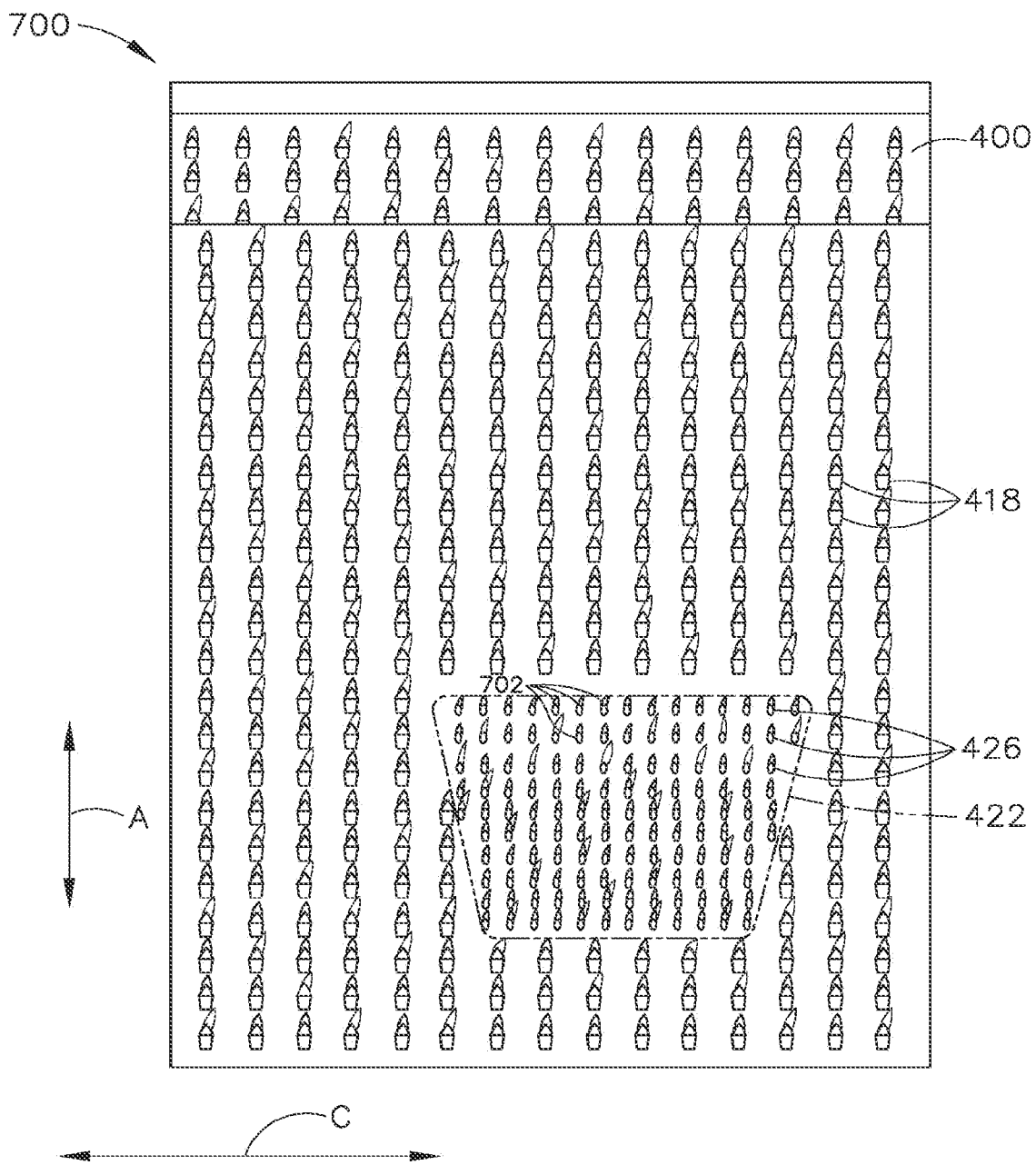

FIG. 7 is a visualization 700 of a flow distribution of a liner portion similar to liner portion 400 (shown in FIG. 4) in accordance with one embodiment of the present disclosure. In other embodiments, flow of fuel-air mixture 365 may swirl in either circumferential direction C or in purely axial direction A. For each embodiment, densely-spaced shield holes 426 are positioned to intercept the flow of fuel-air mixture 365 proximate surface 404 upstream of where the flow of fuel-air mixture 365 is determined to interact with the cooling film. In the example embodiment, liner portion 400 includes patch 422 of plurality of densely-spaced shield holes 426 positioned in a predetermined location. In the predetermined location flow from densely-spaced shield holes 426 intercepts the flow of fuel-air mixture 365 proximate surface 404 to prevent or reduce the interaction of flow of fuel-air mixture 365 (shown in FIG. 3) with the laminar flow of the cooling film. Flow from densely-spaced shield holes 426 changes a direction of the portion of the flow of the intercepted flow of fuel-air mixture 365 using a momentum of a flow of shield air 702 from densely-spaced shield holes 426. Patch 422 is positioned proximate a location determined to be affected by scrubbing of the laminar flow of the cooling film by the flow of fuel-air mixture 365. When fluid exiting densely-spaced shield holes 426 interacts with the flow of fuel-air mixture 365, the flow of fuel-air mixture 365 can no longer disrupt the laminar flow of the cooling film, which can be seen when contrasted with the flow exiting sparsely-spaced film holes 418.

Although sparsely-spaced film holes 418 are shown in FIGS. 4-7 as being axially and circumferentially aligned, sparsely-spaced film holes 418 may be axially and/or circumferentially offset relative to each other.

Figure 8:
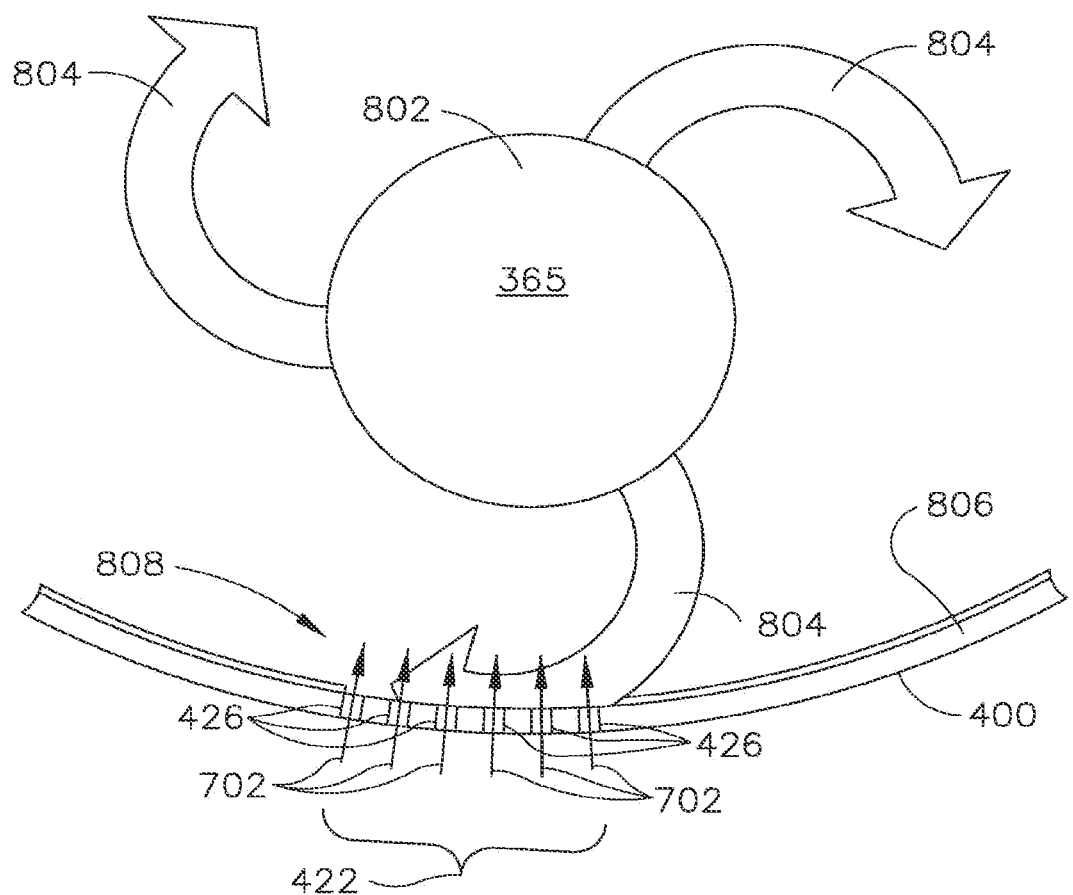

FIG. 8 is an end view of combustor 226 (shown in FIG. 2) looking axially aft or downstream. In the example embodiment, the flows of fluid entering combustor 226 are visualized. Fuel-air mixture 365 includes an axial flow component 802 and circumferential flow components 804, illustrated as discrete flows for clarity. A laminar flow 806 established by sparsely-spaced film holes 418 (not shown in FIG. 8) provides a layer of cooling air over a radially inner surface of liner portion 400. Circumferential flow components 804 of fuel-air mixture 365 spiral away from axial flow component 802 toward liner portion 400 where circumferential flow components 804 interact with a shield flow 808 flowing from densely-spaced shield holes 426 of liner portion 400. Shield flow 808 shields laminar flow 806 from the effects of circumferential flow components 804 facilitating maintaining the integrity of laminar flow 806.

Figures 9, 10:
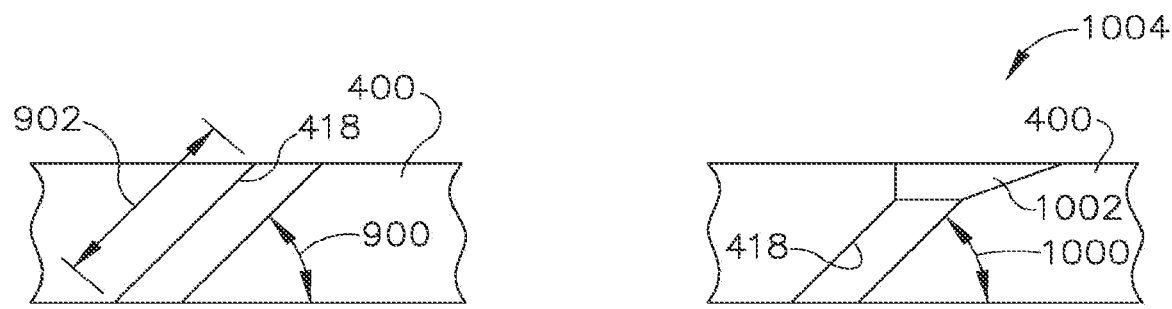

FIG. 9 is a side view of liner portion 400 illustrating an embodiment of sparsely-spaced film holes 418. In the example embodiment, sparsely-spaced film holes 418 extend through liner portion 400 at an oblique angle 900. Sparsely-spaced film holes 418 may be formed in any cross-section, such as, but not limited to, circular, oval, polygonal, and the like. Sparsely-spaced film holes 418 each include a length 902 and the cross-section of sparsely-spaced film holes 418 may vary along length 902.

FIG. 10 is a side view of liner portion 400 illustrating another embodiment of sparsely-spaced film holes 418. In the example embodiment, sparsely-spaced film holes 418 extend through liner portion 400 at an oblique angle 1000. Sparsely-spaced film holes 418 include a diffuser 1002 at an exit end 1004.

Figure 11:
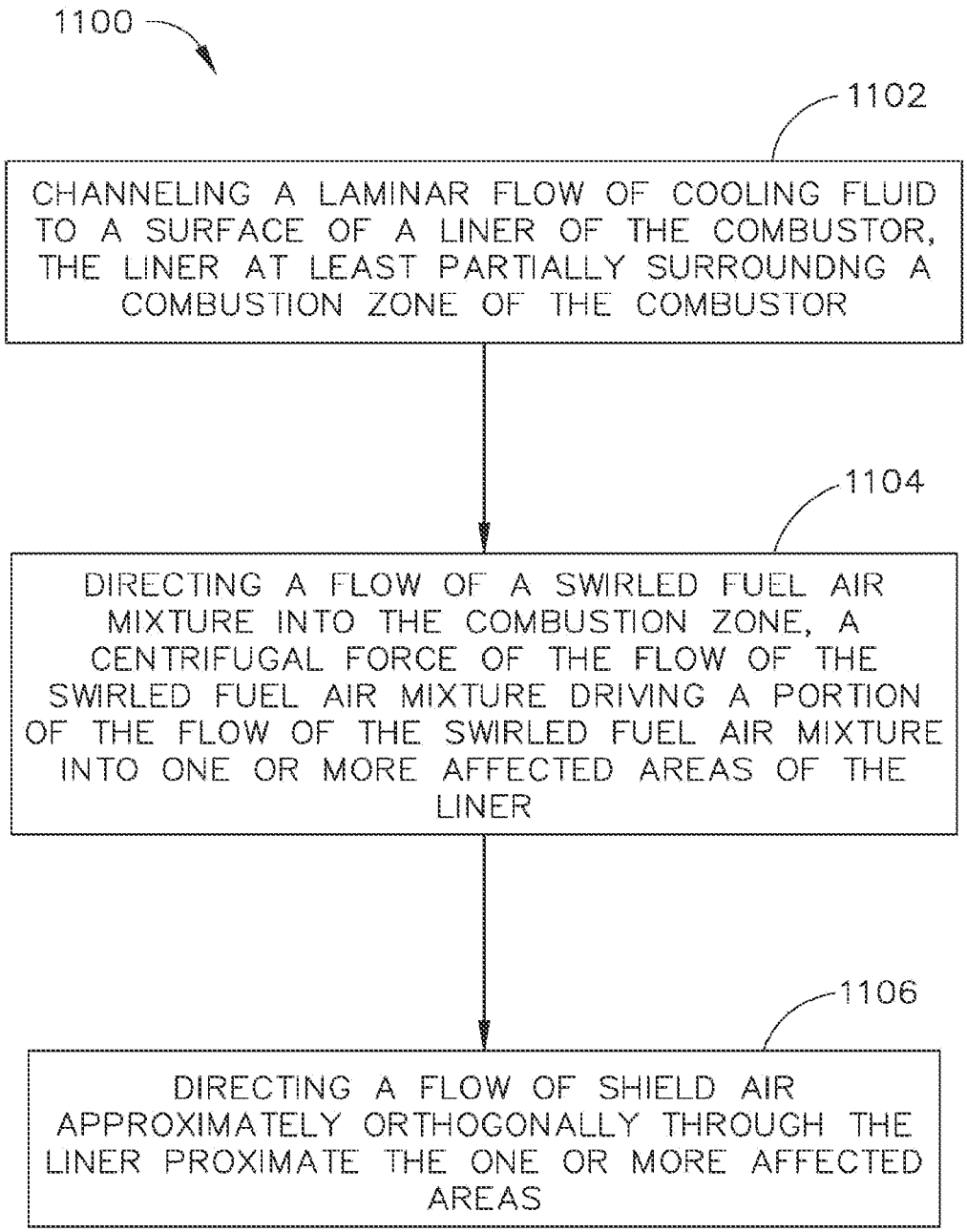

FIG. 11 is a flowchart of a method 1100 of reducing film cooling scrubbing in a combustor. In the example embodiment, the method includes channeling 1102 a laminar flow of cooling fluid to a surface of a liner of the combustor, the liner at least partially surrounding a combustion zone of the combustor, directing 1104 a flow of a swirled fuel air mixture into the combustion zone, a centrifugal force of the flow of the swirled fuel air mixture driving a portion of the flow of the swirled fuel air mixture into one or more affected areas of the liner, and directing 1106 flow of shield air through the liner proximate the one or more affected areas.

The above-described embodiments of a method and system of managing scrubbing provides a cost-effective and reliable means for maintaining a beneficial laminar flow of a cooling fluid along a surface to be protected from a high temperature environment. More specifically, the methods and systems described herein facilitate shielding areas of the surface from scrubbing by a flow of bulk fluid directed towards the surface. In addition, the above-described methods and systems facilitate providing a flow of shield fluid that interacts with the bulk flow to disrupt its effects on the laminar flow. As a result, the methods and systems described herein facilitate extending the life of the surface in a cost-effective and reliable manner.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A combustor for a turbine engine comprising:
   a combustor liner having an inner surface defining a combustion zone;
   an annular dome mounted upstream of the combustion zone;
   a plurality of mixer assemblies spaced circumferentially around the annular dome to form a fuel-air mixture, the fuel-air mixture comprising an axial component and a circumferential component, that is provided to the combustion zone;
   a field defining an area of the combustor liner having a plurality of sparsely-spaced film holes defining a first distance between adjacent sparsely-spaced film holes; and
   a patch defining an area located within the field at a location where the circumferential component interacts with the combustor liner during operation, the patch having a plurality of densely-spaced shield holes defining a second distance between adjacent densely-spaced shield holes, the second distance smaller than the first distance;
   wherein the plurality of sparsely-spaced film holes have a length with a diffuser end defining a film hole exit and the plurality of densely-spaced shield holes have a circular shield hole exit and comprise a cylindrical shape along a full length of each shield hole.

2. The combustor of claim 1 wherein the plurality of sparsely-spaced film holes are angled to form a laminar flow along the inner surface.

3. The combustor of claim 2 wherein the plurality of sparsely-spaced film holes are oriented at an oblique angle with respect to the inner surface.

4. The combustor of claim 2 wherein the plurality of densely-spaced shield holes are angled at the same angle as the plurality of sparsely-spaced film holes with respect to the inner surface.

5. The combustor of claim 2 wherein the plurality of densely-spaced shield holes are oriented orthogonally with respect to the inner surface.

6. The combustor of claim 1, wherein the plurality of sparsely-spaced film holes include a first cross-sectional area and the plurality of densely-spaced shield holes include a second cross-sectional area that is different than the first cross-sectional area.

7. A combustor liner comprising:
   an inner surface defining a combustion zone for receiving a fuel-air mixture comprising an axial component and a circumferential component;
   a field defining an area of the combustor liner having a plurality of sparsely-spaced film holes defining a first distance between adjacent sparsely-spaced film holes; and
   a patch defining an area located within the field at a location where the circumferential component interacts with the combustor liner during operation, the patch having a plurality of densely-spaced shield holes defining a second distance between adjacent densely-spaced shield holes, the second distance smaller than the first distance;

wherein the plurality of sparsely-spaced film holes have a length with a diffuser end defining a film hole exit and the plurality of densely-spaced shield holes have a circular shield hole exit and comprise a cylindrical shape along a full length of the shield hole.

8. The combustor liner of claim 7 wherein the plurality of sparsely-spaced film holes are oriented at an oblique angle with respect to the inner surface.

9. The combustor liner of claim 8 wherein the plurality of densely-spaced shield holes are oriented orthogonally with respect to the inner surface.

10. The combustor liner of claim 7, wherein the plurality of sparsely-spaced film holes include a first cross-sectional area and the plurality of densely-spaced shield holes include a second cross-sectional area that is different than the first cross-sectional area.

11. A method of reducing an interaction of a fuel-air mixture with a cooling film in a combustor having a combustor liner at least partially defining a combustion zone, the method comprising:

flowing a cooling fluid through a set of film holes in the combustor liner;

diffusing the cooling fluid through a diffuser end in the set of film holes;

forming a laminar flow of the cooling fluid along an inner surface of the combustor liner;

swirling a fuel-air mixture into the combustion zone to form an axial flow component and a circumferential flow component;

flowing the cooling fluid through a set of shield holes comprising a cylindrical shape extending through the combustor liner in an area on the inner surface of the combustor liner where the circumferential flow component interacts with the laminar flow;

exhausting the cooling fluid through a shield hole exit having a circular cross-section; and forming a shield flow for shielding the laminar flow from the circumferential flow component.

12. The method of claim 11, wherein flowing the cooling fluid through the set of film holes comprises flowing the cooling fluid through sparsely-spaced film holes in the combustor liner.

13. The method of claim 12, wherein flowing the cooling fluid through the set of shield holes comprises flowing the cooling fluid through a patch of densely-spaced film holes relative to the sparsely-spaced film holes in the combustor liner.

14. The method of claim 11, further comprising changing a direction of the circumferential flow component with a momentum of the shield flow.

* * * * *